Patented Sept. 12, 1933

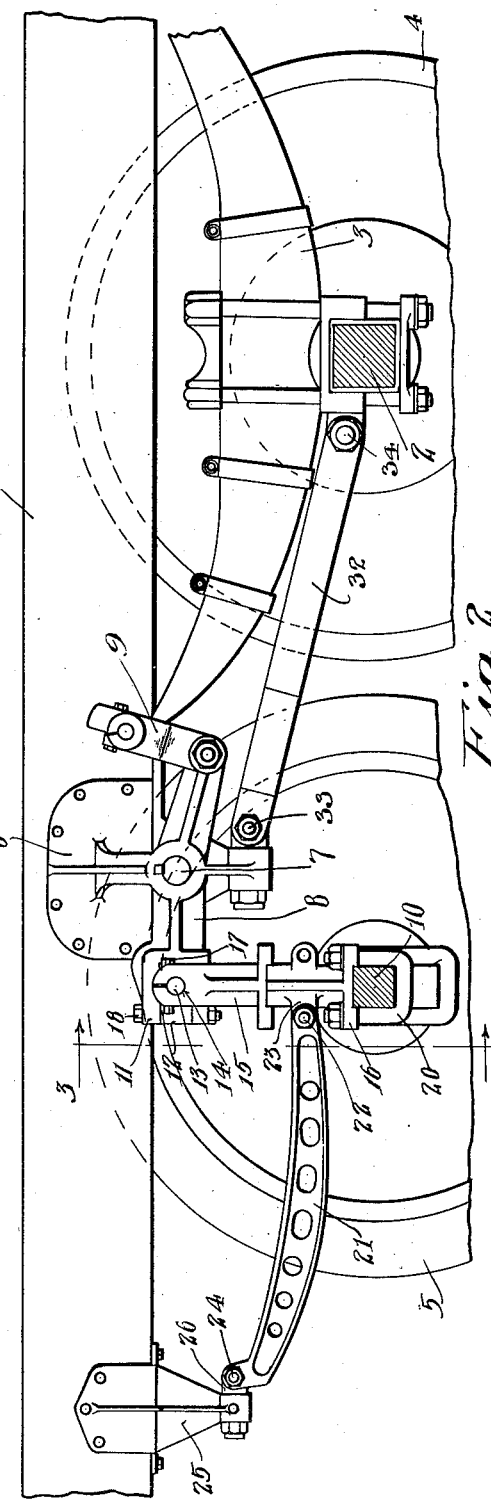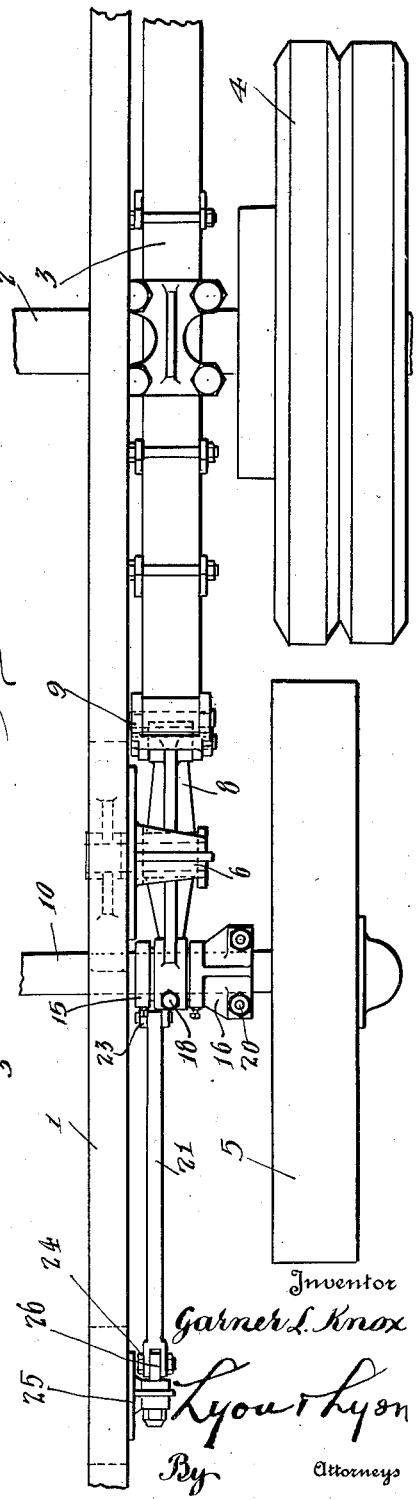

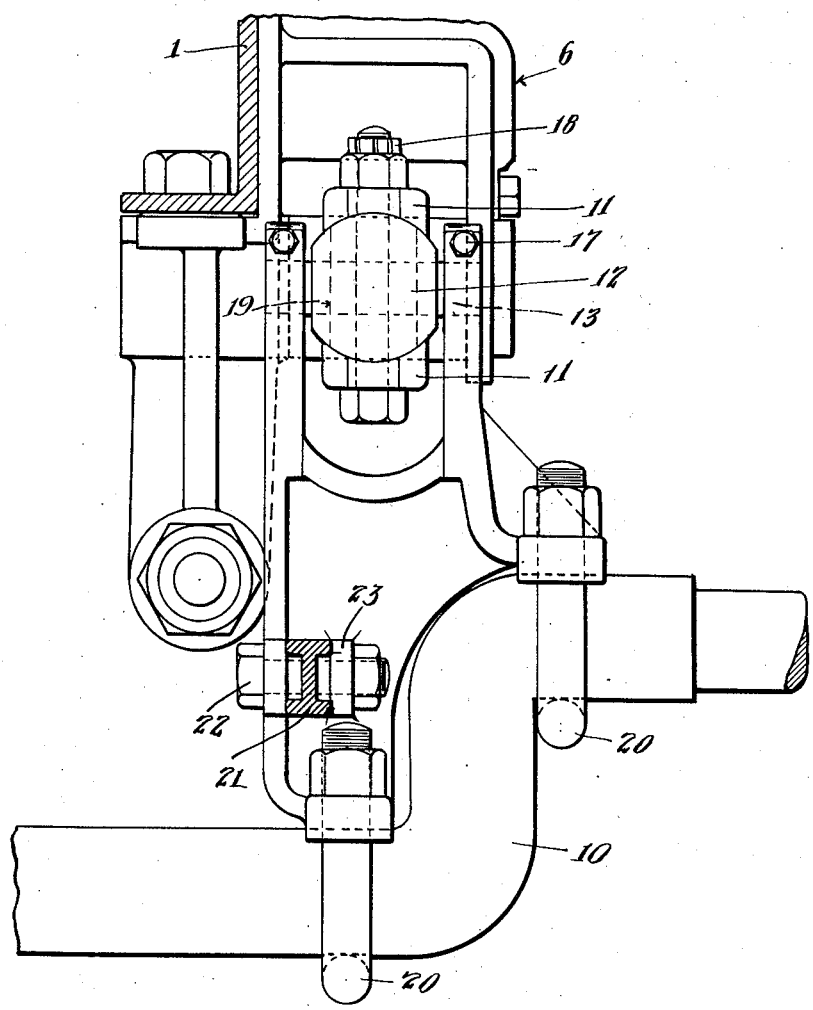

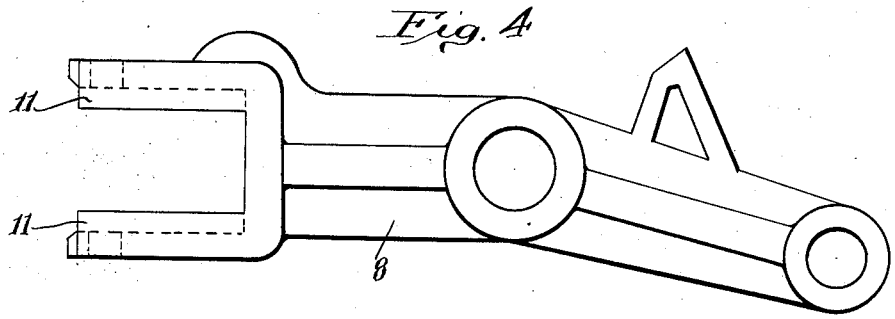
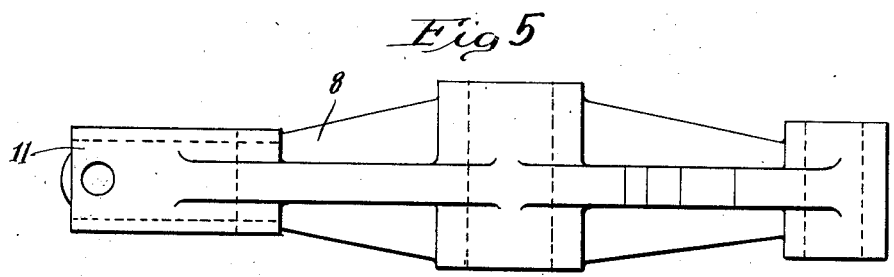
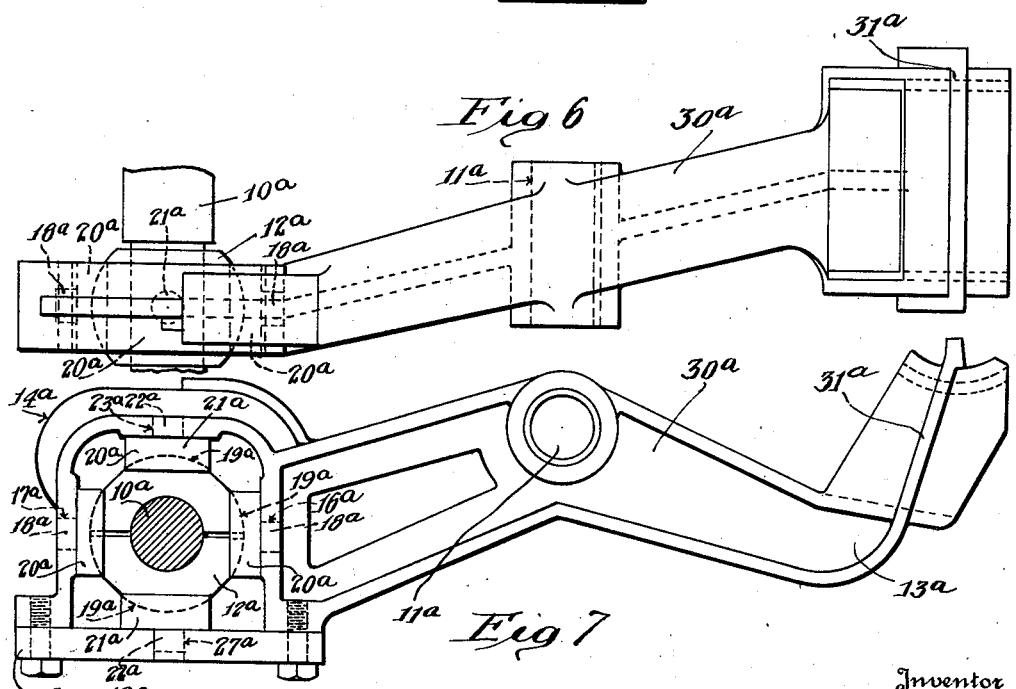

1,926,727

UNITED STATES PATENT OFFICE

1,926,727

SIX-WHEEL ATTACHMENT FOR MOTOR VEHICLES

Garner L. Knox, Los Angeles, Calif., assignor, by mesne assignments, to Six Wheel Corporation, Los Angeles, Calif., a corporation of California Application January 3, 1927. Serial No. 158,560

17 Claims. (Cl. 280—104)

This invention relates to six wheel attachments for motor vehicles, and is more particularly directed to a six wheel attachment for trucks, buses and the like, for distributing the load carried by the motor vehicle to the added wheels, to remove from the rear wheels of such a motor vehicle a portion of the load customarily carried thereby.

Six wheel attachments for motor vehicles have been manufactured heretofore but these attachments have been of such a construction that the added wheels are carried by the frame of the motor vehicle and by the spring supporting the rear wheels, so that when depressions or bumps are encountered in the road, one of these wheels will lift clear of the ground. This lifting of one wheel of the attachment clear of the ground imposes on the opposite wheel the whole load which is distributed to the added wheels of the attachment added by such attachment.

It is therefore an object of this invention to provide a six wheel attachment for motor vehicles, which attachment includes a universal swivel connection between the axle of the six wheel attachment and the motor vehicle frame, so as to permit the wheels to traverse the roadway and be maintained on the roadway irrespective of the road irregularities.

Other objects and advantages of this invention will be apparent from the following detailed description of a preferred embodiment thereof, as illustrated in the accompanying drawings.

In the drawings:

Figure 1 is a side elevation of a six wheel attachment embodying this invention, illustrating one pair of wheels broken away.

Figure 2 is a top plan view of the six wheel attachment illustrated in Fig. 1, illustrating only one side of the vehicle frame and one of the universal swivel connecting means for the six wheel attachment.

Figure 3 is a sectional end elevation taken on the line 3—3 of Fig. 1.

Figure 4 is a side elevation of a rocker arm embodied in this invention.

Figure 5 is a top plan view of the rocker arm illustrated in Fig. 4.

Figure 6 is a top plan view of a modified form of rocker arm embodied in this invention.

Figure 7 is a side elevation of the rocker arm illustrated in Fig. 6.

Figure 8 is a fragmental sectional rear view of the swivel bearing block shown in Figure 7 illustrating the axle in elevation.

In the preferred embodiment of this invention illustrated in the accompanying drawings, 1 illustrates a motor vehicle frame of any desired or preferred construction, which is supported at the forward end by means of wheels (not shown), and is supported at the rear end on an axle 2 secured to springs 3 at the opposite sides of the frame 1. Wheels 4 are secured to the axle 2 and constitute the driving wheels of the motor vehicle. The springs 3 are pivotally secured to the frame 1 at one end thereof by any suitable means, such as a spring hanger (not shown) of any suitable or desirable construction.

Means are provided for distributing the load customarily carried by the rear wheels 4 to an auxiliary pair of wheels 5, which constitute the six wheel attachment embodying this invention. The six wheel attachment may be secured to the frame 1 either in advance of the rear driving wheels or to the rear thereof, depending upon the location of the driving wheels 4 and the load distribution desired. In the particular illustration of this invention, the six wheel attachment is shown as secured to the frame 1 of the motor vehicle in advance of the driving wheels 4, and constitutes a pair of hanger brackets 6 which are secured to the longitudinally extending frame members of the frame 1 in any suitable or desirable manner. The hanger brackets 6 pivotally support at pins 7 rocker arms 8, which rocker arms 8 are pivotally secured by means of spring hangers 9 to the forward free ends of the springs 3.

Means are provided for securing the axle 10 upon which the auxiliary pair of wheels 5 are journaled, to the rocker arms 7, so as to permit the axle 10 to assume any required position so as to maintain the auxiliary wheels 5 in engagement with the road surfaceway, irrespective of surface irregularities of the roadway, which means preferably constitute a universal swivel connection of the following construction:

Formed in the end of the rocker arms 8 are yokes 11 within which bearing blocks 12 are pivotally supported. Formed through the bearing block 12 is a bore through which a stud 13 is extended, and the stud 13 projects at its opposite end through bores 14 formed in the ends of a yoke 15 which is formed integral with the axle bracket 16. Means of any suitable form, such as illustrated at 17, are provided for clamping the yoke 15 to the ends of the stud 13, so as to rigidly secure the yoke to the stud 13, which pivots within the bore formed in the bearing block 12.

Means are provided for maintaining the bearing block 12 within the yoke 11 of the rocker arm 8, which means may be of any desired or preferred construction and are herein illustrated as comprising a bolt 18, which projects through bores formed in the end of the yoke 11 and through elongate slots 19 formed in the bearing block 12. The provision of the bolt 18 prevents lateral displacement of the bearing block 12 from within the yoke 11, but allows movement of the block 12 and yoke 11 longitudinally of the stud 13 within limits defined by side portions of yoke 15.

The axle 10 is secured to the axle bracket 16 in any suitable or desirable means, such as the U-bolts 20. Means are provided for restricting the free movement of the axle 10 and to limit the pivoting of this axle 10 about the studs 13, which means preferably comprise radius rods 21 which are pivotally secured at pins 22 which are passed through ears 23 formed on the bracket 16 at one end, and is pivotally secured at pins 24 to a radius rod bracket 25 at the opposite end. The pins 24 pass through eye-bolts 26 which are pivotally supported within the radius rod brackets 25 so as to permit lateral pivoting of the axle 16.

Radius rods 32 are pivotally connected at pins 33 to the brackets 6 at one end, and at pins 34 to the axle housing at their opposite ends.

The modified form of rocker arm embodied in this invention constitutes an arm casting 30a which is pivotally supported by a pin which is passed through the cylindrical boss 11a formed near the center of the arm casting 30a. The rocker arm 30a is loosely secured to the free end of the spring 3 of the motor vehicle by the passing of this end of the spring through a saddle 31a which is formed integral with the casting 30a at the end 13a thereof. This manner of freely supporting the free ends of the springs 3 by the rocker arm permits the springs 3 to elongate freely on depression of their curvature, when the vehicle passes over ruts or depressions in the roadway, without imparting on the pivot which is passed through the cylindrical boss 11a undue shearing strains.

Formed at the opposite end 14a of this modified form of rocker arm is a yoke 15a, within which a split bearing block 12—a is mounted. The bearing block is pivotally supported within the yoke 15a by means of trunnions 18a, which are fitted into the bores 16a and 17a of the yoke 15a. The split bearing block 12a is journaled on the axle 10a but is not pinned thereto, but is loosely mounted thereon (see Figs. 6 and 8), thereby allowing some movement endwise of the shaft 10a which is in this case a straight axle. The bearing block 12a is formed with radial bearing faces 19a against which steel bearings 20a and 21a are fitted. Trunnions 18a and 22a are formed integral with the bearings 20a and 21a.

The upper trunnion 22a fits within a bore 23a formed in the upper portion of the yoke 15a. In assembling this modified form of universal swivel connection the bearings 20a are positioned within the yoke 15a with the trunnions 18a fitted within the bores 16a and 17a. The upper half of the split bearing block 12a is then positioned on the rounder portion of the axle 10a so that the same holds the bearing 20a in position, and so that the trunnion 22a extends into the bore 23a of the yoke 15a. The lower half of the split bearing block 12a is then fitted over the axle 10a and a plate 26a is bolted to the yoke 15a. The trunnion 22a fits with a bore 27a formed in the plate 26a.

The arm 30a is bent downwardly from the boss 11a so that the same may be directly secured to the axle by means of the universal swivel connection above described. The manner of formation of the arm 30a eliminates the necessity of using the hanger bracket 15 and the radius rod 21 as the arm 30a itself serves as the radius rod.

The operation of the six wheel attachment embodying my invention is:—

The motor vehicle is loaded, and the load is distributed between the six wheels of the motor vehicle, a portion of the load that is ordinarily carried by the rear wheels 4 being transmitted to the auxiliary wheels 5 through the connection made with the springs 3 and the axle 10, upon which the auxiliary wheels 5 are journaled. During the operation of the motor vehicle, as one auxiliary wheel 5 on one side of the vehicle frame 1 passes into a depression in the roadway, the axle 10 is permitted to tilt on the bearing block 12 so as to maintain this wheel 5 in engagement with the roadway surface without necessitating the complementary rear wheel 4 also passing into a like depression. Without the provision of this universal swivel attachment, when such a rear wheel 5 will pass over a depression in the roadway surface, it would be elevated clear of the surface and would not at that moment carry its required portion of the load, but the portion of the load which it should be carrying would be transmitted to the opposite auxiliary wheel 5, imposing upon this opposite wheel 5 such a load as to cause the setting up in this wheel 5 and axle 10 crushing and shearing strains which result in the breaking down of the six wheel attachment. This imposing of shearing and crushing strains upon the auxiliary wheels 5 when such a universal swivel attachment is not provided is also present when one of the wheels 5 passes over a raise or bump in the roadway surface.

Provision of this universal swivel attachment for the auxiliary wheels 5, it will also be obvious, permits the operation of the motor vehicle along the roadway without such great damage to the roadway surface, as would be incident to the use of a six wheel truck where the auxiliary or added wheels were rigidly mounted.

Having fully described the preferred embodiment of my invention, it is to be understood that many modifications may be made therein without departing from the spirit of my invention as set forth in the appended claims.

I claim:—

1. In a six wheel attachment for motor vehicles, the combination of a frame, a pair of hanger brackets secured to the frame, rocker arms pivotally supported by the brackets, means for securing one end of the arms to one end of the springs supporting the rear end of the frame, an axle, universal means for securing the axle at the opposite sides of the frame to the rocker arms, and wheels journaled on the axle.

2. In a six wheel attachment for motor vehicles, the combination of an axle, wheels journaled on the axle, a pair of rocker arms, means for pivotally supporting the rocker arms intermediate their ends from the vehicle frame, universal swivel connecting means between the axle and one end of each rocker arm, and means for securing the opposite ends of the rocker arms to free ends of the rear springs of the motor vehicle.

3. The combination of a motor vehicle chassis including a frame with front and rear wheels, the rear wheels being secured to the frame by means of springs secured to the axle supporting the rear wheels, one end of the springs being secured to the frame and the opposite ends of the springs being free, hanger brackets secured to the frame on opposite sides thereof, means securing the ends of the rocker arms to the free ends of the springs, an axle, wheels journaled on the axle, and universal swivel means for securing the axle to the opposite ends of the rocker arms.

4. In combination with a motor vehicle chassis including a frame and front and rear wheels, the rear wheels being secured to the frame by means of springs secured to the axle supporting the rear wheels, one end of the springs being secured to the frame and the opposite end of the springs being free, hanger brackets secured to the frame on the opposite sides thereof, means securing the adjacent ends of the rocker arms to the free ends of the springs, an axle, wheels journaled on the axle, universal swivel means for securing the axle to the opposite ends of the rocker arms, and radius rods secured to the frame and to the universal swivel means.

5. In combination with a motor vehicle chassis including a frame and front and rear wheels, the rear wheels being secured to the frame by means of springs secured to the rear axle, one end of the springs being secured to the frame and the opposite end of the springs being free, hanger brackets secured to the frame on the opposite sides thereof, means securing the adjacent ends of the rocker arms to the free end of the springs, an axle, wheels journaled on the axle, universal swivel means for securing the axle to the opposite ends of the rocker arms, radius rods, means for pivotally securing the radius rods to the universal swivel means, and universal swivel means for securing the radius rods to the frame.

6. In combination with a motor vehicle chassis including a frame and front and rear wheels, the rear wheels being secured to the frame by means of a spring secured to the rear wheel axle, one end of the spring being secured to the frame and the opposite end of the spring being free, hanger brackets secured to the frame on opposite sides thereof, means slidably securing the ends of the rocker arms to the free ends of the spring, an axle, wheels journaled on the axle, and universal swivel means for securing the axle to the opposite ends of the rocker arms.

7. In combination with a motor vehicle chassis including a frame and front and rear wheels, the rear wheels being secured to the frame by means of springs, one end of the spring being secured to the frame and the opposite end being free, hanger brackets secured to the frame on the opposite sides thereof, means securing the ends of the rocker arms to the free ends of the springs, an axle, wheels journaled on the axle, bearing blocks pivotally supported in the opposite ends of the rocker arms, and axle hangers pivotally secured to the bearing blocks at one end and secured to the axle at the other end.

8. In a six-wheel attachment for motor vehicles, the combination of an axle, wheels journaled on the axle, axle hangers secured to the axle, rocker arms, universal swivel means for securing the rocker arms at one end to the axle hangers, and means for securing the other end of the rocker arms to the free ends of the rear spring of the motor vehicle.

9. The combination with a six-wheel attachment for motor vehicles, of a rocker arm, means for pivotally supporting the rocker arm intermediate its ends, slidable means formed integral with the rocker arms for securing the same to the free ends of springs, a yoke formed at the opposite end of the rocker arm, and a bearing block pivotally mounted within the yoke.

10. The combination with a six-wheel attachment for motor vehicles, of a rocker arm, means for pivotally supporting the rocker arm intermediate its ends, means for securing one end of the rocker arm to the free end of a spring of the motor vehicle, a yoke formed at the opposite end of the rocker arm, a bearing block in which the axle of the attachment is journaled pivotally mounted in the yoke.

11. The combination with a six wheel attachment for motor vehicles of a pair of combined radius and rocker arms, means for pivotally mounting the rocker arms, means for securing one end of each rocker arm to the free end of a spring of the motor vehicle and universal swivel means for securing the opposite end of the rocker arm to the axle of the attachment.

12. The combination with a vehicle comprising a frame, an axle with wheels thereon and leaf springs mounted betwen their ends on said axle and connected at one end with said frame, of an extra axle with wheels thereon, brackets secured to said frame between said axles, levers fulcrumed to said brackets between the ends of the levers, one arm of each lever being connected with the extra axle for the oscillatory motion of said axle relatively to said levers, links connecting the other arms of said levers and the other ends of said springs, and radius bars connecting the first named axle and brackets.

13. The combination with a vehicle comprising a frame, an axle with wheels thereon and leaf springs supported by said axle and supporting said frame, of an extra axle with wheels thereon, brackets attached to said frame, levers fulcrumed to said brackets and connected with said extra axle for the oscillatory motion of said axle relatively to said levers, radius bars connected to the first named axle and said brackets, and means connecting said levers and springs.

14. The combination with a vehicle comprising a frame, springs, an axle with wheels thereon supporting said springs intermediate the ends thereof, said springs having one of their ends connected to the ends of a pair of rocker arms, brackets on said frame for pivotally supporting said rocker arms intermediate their ends, an additional axle mounting wheels, additional brackets on said frame and connections from said last named brackets to said last named axle and means connecting said last named axle to said rocker arms whereby said axle may have oscillatory movement relative to said rocker arms.

15. In a motor vehicle, an axle having wheels thereon, a frame, springs connected to said frame having one of their ends connected by links to rocker arms, means for pivotally mounting said rocker arms on said frame intermediate their ends, a second axle having wheels thereon, means for connecting said axle to said rocker arms, said means having means permitting said last named axle to have oscillatory movement relative to said rocker arms.

16. The combination with a vehicle comprising a frame, an axle with wheels thereon and leaf springs supported by said axle and supporting said frame, said leaf springs having a connection to rocker arms pivotally mounted on said frame, a second axle having wheels thereon, connecting means between said second axle and the opposite ends of said rocker arms providing universal movement of said axle relative to said rocker arms, and links pivotally connecting said last named axle with said frame.

17. A vehicle comprising a frame, an axle, wheels on said axle, a spring mounted on said axle, a second axle, a rocker arm pivoted to said frame, means connecting said last mentioned axle and one end of said rocker arm including a universal joint and means connecting the other end of said rocker arm with said spring.

GARNER L. KNOX.